(12) United States Patent
Watanabe et al.

(10) Patent No.: US 11,891,462 B2
(45) Date of Patent: Feb. 6, 2024

(54) PHOTOCURABLE RESIN COMPOSITION AND 3D STEREOLITHOGRAPHY PRODUCT USING SAME

(71) Applicant: NAGASE CHEMTEX CORPORATION, Osaka (JP)

(72) Inventors: Koji Watanabe, Tatsuno (JP); Hiroaki Ozoe, Tatsuno (JP)

(73) Assignee: Nagase Chemtex Corporation, Osaka (JP)

(*) Notice: Subject to any disclaimer, the term of this patent is extended or adjusted under 35 U.S.C. 154(b) by 218 days.

(21) Appl. No.: 17/428,910

(22) PCT Filed: Feb. 14, 2020

(86) PCT No.: PCT/JP2020/005904
§ 371 (c)(1),
(2) Date: Aug. 5, 2021

(87) PCT Pub. No.: WO2020/170990
PCT Pub. Date: Aug. 27, 2020

(65) Prior Publication Data
US 2022/0127386 A1    Apr. 28, 2022

(30) Foreign Application Priority Data

Feb. 19, 2019    (JP) ................. 2019-027834

(51) Int. Cl.
| | |
|---|---|
| *C08F 2/46* | (2006.01) |
| *C08F 2/50* | (2006.01) |
| *C08G 61/04* | (2006.01) |
| *B33Y 10/00* | (2015.01) |
| *B33Y 70/00* | (2020.01) |
| *B29C 64/129* | (2017.01) |
| *C08F 222/10* | (2006.01) |
| *C08F 220/30* | (2006.01) |
| *C08F 220/20* | (2006.01) |
| *C08F 224/00* | (2006.01) |
| *C08K 3/36* | (2006.01) |
| *C08K 5/5397* | (2006.01) |
| *C08K 9/04* | (2006.01) |
| *B29K 33/00* | (2006.01) |

(52) U.S. Cl.
CPC .............. *C08F 2/50* (2013.01); *B29C 64/129* (2017.08); *B33Y 10/00* (2014.12); *B33Y 70/00* (2014.12); *C08F 220/20* (2013.01); *C08F 220/306* (2020.02); *C08F 222/1065* (2020.02); *C08F 224/00* (2013.01); *C08K 3/36* (2013.01); *C08K 5/5397* (2013.01); *C08K 9/04* (2013.01); *B29K 2033/08* (2013.01); *C08K 2201/005* (2013.01); *C08K 2201/011* (2013.01)

(58) Field of Classification Search
CPC ........ B33Y 70/00; B33Y 70/10; B33Y 10/00; C08K 5/5397; C08K 9/04; C08K 3/36; C08K 2201/005; C08K 2201/011; C08F 290/067; C08F 2/44; C08F 2/50; C08F 220/306; C08F 220/20; C08F 220/282; C08F 220/302; C08F 220/301; C08F 222/1065; B29C 64/129; B29K 2033/08
USPC .................. 522/82, 71, 1, 189, 184, 6; 520/1
See application file for complete search history.

(56) References Cited

U.S. PATENT DOCUMENTS

| | | | |
|---|---|---|---|
| 2004/0197603 A1* | 10/2004 | Hashimoto | G11B 5/73 428/840.2 |
| 2017/0267881 A1 | 9/2017 | Kohzuki et al. | |
| 2018/0244831 A1 | 8/2018 | Hirata et al. | |
| 2019/0241691 A1 | 8/2019 | Kito et al. | |
| 2020/0181433 A1 | 6/2020 | Yoshinaga et al. | |
| 2022/0243059 A1* | 8/2022 | Verbeke | B33Y 10/00 |

FOREIGN PATENT DOCUMENTS

| | | |
|---|---|---|
| CN | 101356204 A | 1/2009 |
| JP | 2008133460 A1 | 6/2008 |
| JP | 2016112824 A | 6/2016 |
| JP | 2019099750 A | 6/2019 |

OTHER PUBLICATIONS

International Search Report and Written Opinion, PCT/JP2020/005904, dated Apr. 7, 2020, 8 pages.

* cited by examiner

*Primary Examiner* — Jessica Whiteley
(74) *Attorney, Agent, or Firm* — Stinson LLP

(57) ABSTRACT

A photocurable resin composition includes a reactive monomer, a reactive oligomer, and a photopolymerization initiator. A cured product of the reactive monomer has a glass transition point of less than 20° C., and a cured product of the reactive oligomer has a glass transition point of less than 20° C. A cured product of the photocurable resin composition has a loss tangent tan δ at 25° C. of 0.2 or less. The cured product of the photocurable resin composition has an elongation at break in accordance with ASTM D638 of 150% or more.

24 Claims, 1 Drawing Sheet

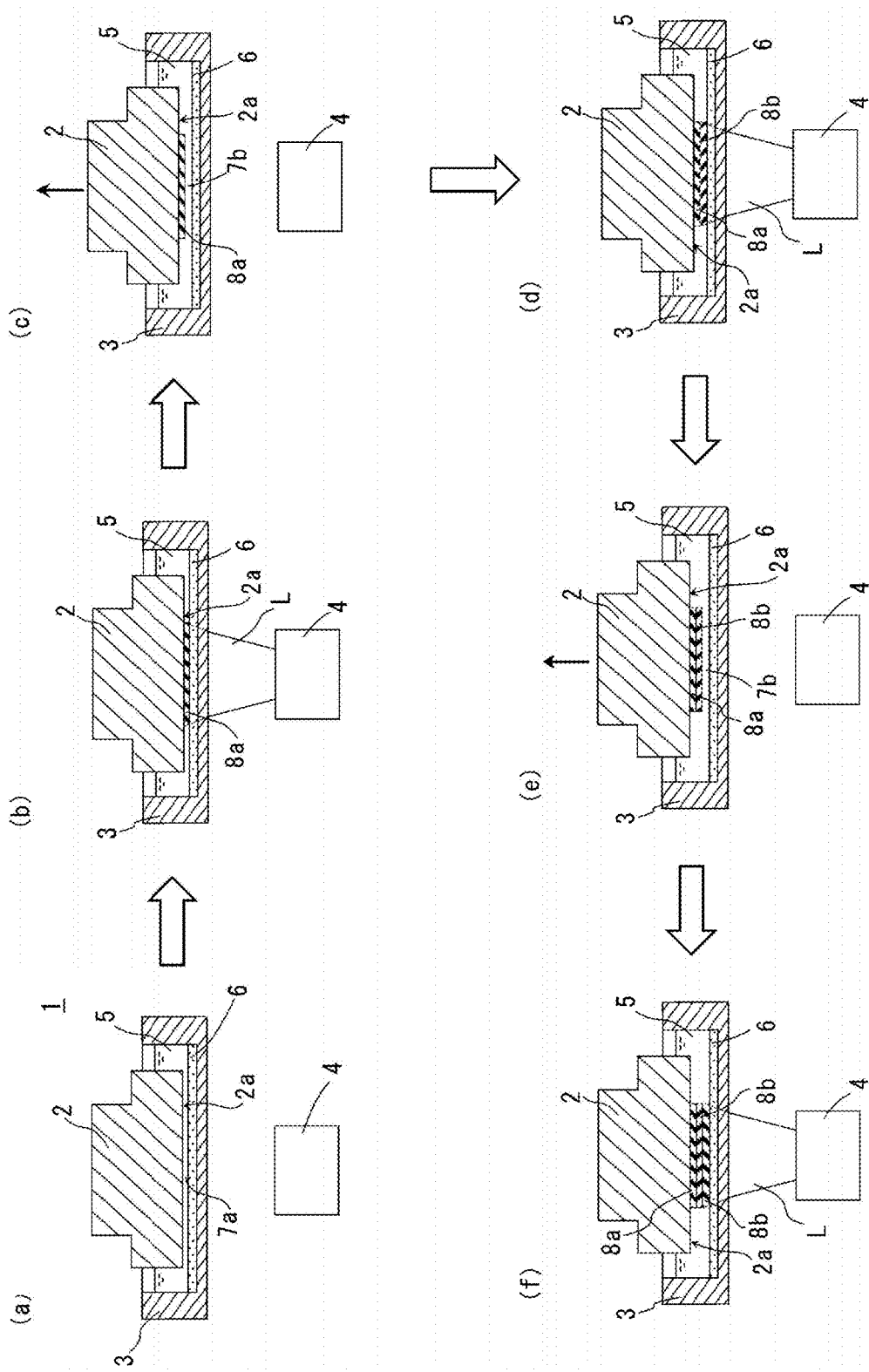

PHOTOCURABLE RESIN COMPOSITION AND 3D STEREOLITHOGRAPHY PRODUCT USING SAME

REFERENCE TO RELATED APPLICATIONS

This application is a U.S. national stage application of International Patent Application No. PCT/JP2020/005904, filed Feb. 14, 2020, which claims the benefit of Japanese Patent Application No. 2019-027834, filed Feb. 19, 2019, the entire disclosures of which are incorporated herein by reference.

TECHNICAL FIELD

The present invention relates to a photocurable resin composition, and a three-dimensional optical shaped object using the photocurable resin composition.

BACKGROUND ART

As shaping techniques such as 3D printers become more advanced, the development of photocurable resin compositions suitable for optical shaping applications is now underway.

PTL 1 proposes a composition for a model material, which is used to shape a model material by ink-jet optical shaping technique and contains a monofunctional monomer (A) and an oligomer (B) as photocurable components, wherein the composition contains 20 to 90 parts by weight of a specific (meth)acrylate monomer as the component (A), and 5 parts by weight or more of a multifunctional oligomer as the component (B), based on 100 parts by weight of the whole of a resin composition.

CITATION LIST

Patent Literature

[PTL 1] WO 2017/222025

SUMMARY OF INVENTION

Technical Problem

With PTL 1, the flexibility of the cured product can be increased, but it is difficult to ensure high elasticity such as that of rubber (hereinafter also referred to as "rubber elasticity").

Solution to Problem

An aspect of the present invention relates to a photocurable resin composition including a reactive monomer, a reactive oligomer, and a photopolymerization initiator,
wherein a cured product of the reactive monomer has a glass transition point of less than 20° C.,
a cured product of the reactive oligomer has a glass transition point of less than 20° C.,
a cured product of the photocurable resin composition has a loss tangent tan δ at 25° C. of 0.2 or less, and
the cured product of the photocurable resin composition has an elongation at break in accordance with ASTM D638 of 150% or more.

Another aspect of the present invention relates to a three-dimensional optical shaped object that is a photocured product of the above-described photocurable resin composition.

Yet another aspect of the present invention relates to a three-dimensional optical shaped object that is a photocured product of a photocurable resin composition, wherein the three-dimensional optical shaped object has a glass transition point of less than 20° C., a loss tangent tan δ at 25° C. of 0.2 or less, and an elongation at break in accordance with ASTM D638 of 150% or more.

Advantageous Effects of Invention

It is possible to provide a photocurable resin composition capable of providing a cured product having excellent rubber elasticity.

BRIEF DESCRIPTION OF DRAWING

FIG. 1 is a schematic diagram for illustrating steps of forming a three-dimensional optical shaped object, using a photocurable resin composition according to an embodiment of the present invention.

DESCRIPTION OF EMBODIMENT

While the novel features of the invention are set forth in the appended claims, the invention, both as to organization and content, will be better understood and appreciated, along with other objects and features thereof, from the following detailed description taken in conjunction with the drawing.

In order to impart high rubber elasticity to a cured product of a photocurable resin composition, it is necessary to not only increase the extensibility and the flexibility of the cured product, but also ensure the strength for the extended cured product to be restored to the original state without breaking. Usually, the extensibility or flexibility and the strength of a cured product tend to be in a trade-off relationship, and it is therefore difficult to achieve both of them at the same time. Even when a cured product has high extensibility or flexibility while a certain degree of strength is ensured therefor, the cured product may have high viscosity, and the stress resulting from deformation may thus be relaxed. In such a case, the extended cured product is low in shrinkability, and it is thus difficult to achieve excellent rubber elasticity. In addition, in optical shaping applications, a photocurable resin composition is required to be quickly cured. Increasing the curing speed makes it difficult to control the curing reaction, so that it becomes more difficult to obtain a cured product without stress relaxation, while controlling the extensibility or the flexibility and the strength. For this reason, it has heretofore been difficult to obtain a cured product having excellent rubber elasticity.

A photocurable resin composition according to an aspect of the present invention is a photocurable resin composition including a reactive monomer, a reactive oligomer, and a photopolymerization initiator. Here, the glass transition point (Tg) of a cured product of the reactive monomer is less than 20° C., and the Tg of a cured product of the reactive oligomer is less than 20° C. The loss tangent tan δ at 25° C. of a cured product of the photocurable resin composition is 0.2 or less, and the elongation at break in accordance with ASTM D638 of the cured product of the photocurable resin composition is 150% or more.

According to the above-described aspect of the present invention, the cured products of each of the reactive monomer and the reactive oligomer both show a Tg of <20° C., and the cured products thereof have a tan δ of ≤0.2, and an elongation at break of 150% or more. Accordingly, it is possible to ensure high flexibility and/or extensibility. It is also possible to suppress the stress relaxation of the cured product, and ensure a certain degree of strength therefor. Furthermore, by using the reactive monomer and the reactive oligomer, the curing reaction can be easily controlled even at a high curing speed, thus making it possible to easily control the extensibility, flexibility, and strength of the cured product, and easily reduce the stress relaxation thereof. Thus, it is possible to obtain a cured product having excellent rubber elasticity. Therefore, such a photocurable resin composition is suitable for use as a material for three-dimensional optical shaping.

The "reactive" as used for the reactive monomer and the reactive oligomer means having a reactive group that participates in a curing reaction utilizing a photopolymerization initiator.

The reactive oligomer refers to an oligomer including at least a repeating moiety of constituent units (having a number of repeating units of 2 or more), and shall be distinguished from the reactive monomer.

As used herein, the reactive monomer and the reactive oligomer may simply be referred to as a reactive compound.

The loss tangent tan δ is the ratio: G"/G' between the storage shear modulus G' at a temperature t of the photocurable resin composition, and the loss shear modulus (G"). The storage shear modulus G' and the loss shear modulus G" can be measured using a viscoelasticity measuring device compliant with JIS K 7244-1:1998. Specifically, the storage shear modulus G' and the loss shear modulus G" can be measured for a test piece having a thickness of 500 using a commercially available dynamic mechanical analyzer (DMA), at frequency of 1 Hz and a temperature rising rate of 5° C./min for a predetermined temperature range (e.g., −100° C. to +100° C.).

The Tg of a cured product of the reactive monomer is a Tg measured for a cured product of the reactive monomer, using a commercially available DMA, for example. Similarly, the Tg of a cured product of the reactive oligomer can be measured for a cured product of the reactive oligomer, using a DMA. The Tg of each of the reactive compounds may be measured for a cured product obtained by curing each of the reactive compounds separated from the photocurable resin composition, or a reactive compound may be identified from the photocurable resin composition, then the Tg may be measured for a cured product obtained by curing the same compound that has been separately prepared. If the same compound is not easily available, the Tg measured using a compound having a similar structure may be used as the Tg of the cured product of the above-described reactive compound. Note that the separation of the reactive compound from the photocurable resin composition can be performed, for example, using a known separation method such as centrifugal separation, extraction, crystallization, column chromatography, and/or recrystallization. The identification of the reactive compound can be performed, for example, by analyzing the photocurable resin composition by using gas chromatography, liquid chromatography, and/or a mass spectrometry.

The elongation at break is measured using a test piece formed of a cured product of the photocurable resin composition. Usually, a test piece having a thickness of 500 μm and a width of 15 mm is used as the test piece. The measurement is carried out at 23° C., an interchuck distance of 20 mm, and a tensile speed of 200 mm/min. Note that a commercially available tensile tester is used for the measurement. The elongation at break is a ratio (=(L1−L0)/L0× 100(%)) of the difference (=L1−L0) between a length L1 of the test piece at break and an initial length L0 of the test piece to L0. Physical properties of a plurality of (e.g., five) test pieces are measured, and the measured values are averaged to obtain an average value.

The Shore A hardness at 23° C. of the cured product of the photocurable resin composition is preferably 100 or less. In this case, high flexibility can be ensured for the cured product.

As used herein, the Shore A hardness of the cured product can be measured using a cured product having a thickness of 4 mm or more, under a load of 1 kg by using with a commercially available durometer, in accordance with JIS K 6253:2012.

The weight-average molecular weight (Mw) of the reactive oligomer is preferably greater than 10,000 and less than or equal to 30,000. In this case, it is possible to ensure high strength for the cured product, and increase the effect of suppressing the stress relaxation due to deformation.

As used herein, Mw is a weight-average molecular weight in terms of polystyrene, as measured by gel permeation chromatography.

The mass ratio between the reactive monomer and the reactive oligomer is preferably 20/80 to 80/20. In this case, it is possible to ensure high strength for the cured product, and increase the effect of suppressing the stress relaxation due to deformation.

The reactive monomer preferably includes a monofunctional acrylic monomer having a non-aromatic ring. When such a monomer is used, higher flexibility and/or extensibility is likely to be achieved, and the effect of suppressing the stress relaxation due to deformation is high. Also, high optical shaping properties can be achieved, and Tg can be easily kept low.

The reactive oligomer preferably includes a polyoxyalkylene chain. In this case, higher rubber elasticity is likely to be achieved for the cured product, and it is possible to obtain a cured product excellent in elongation and strength.

From the viewpoint of ease of ensuring high optical shaping properties, the reactive oligomer preferably includes an acrylic oligomer.

The viscosity of the photocurable resin composition is, for example, 10 mPa·s or more and 7000 mPa·s or less, at 25° C. In this case, the rubber elasticity can be more easily enhanced. From the view point of ease of performing optical shaping, the viscosity at 25° C. of the photocurable resin composition is preferably 3000 mPa·s or less. The viscosity at 25° C. of the photocurable resin composition may be 200 mPa·s or more and 3,000 mPa·s or less.

Note that the viscosity of the photocurable resin composition can be measured, for example, at a rotational speed of 20 rpm, using a cone-plate E type viscometer.

Another aspect of the present invention encompasses a three-dimensional optical shaped object that is a photocured product of the above-described photocurable resin composition. Yet another aspect of the present invention also encompasses a three-dimensional optical shaped object that is a photocured product of a photocurable resin composition, wherein the three-dimensional optical shaped object has a Tg of less than 20° C., a loss tangent tan δ at 25° C. of 0.2 or less, and an elongation at break in accordance with ASTM D638 of 150% or more. Such a three-dimensional optical shaped object has excellent rubber elasticity and is suitable for use as various elastic members (e.g., a shoe cushion material and the like).

In the following, the configurations of the photocurable resin composition and the cured product (optical shaped object) will be described more specifically.

[Photocurable Resin Composition]

The photocurable resin composition includes a reactive monomer, a reactive oligomer, and a photopolymerization initiator. The photocurable resin composition may further include ceramic particles.

(Reactive Monomer)

As the reactive monomer, a compound that can be cured or polymerized by the action of radicals, cations, and/or anions generated by light irradiation is used. As the reactive monomer, at least a reactive monomer (first reactive monomer) whose cured product has a Tg of less than 20° C. is used. The Tg of the cured product the first reactive monomer may be less than 20° C. However, from the viewpoint of ease of stably ensuring high rubber elasticity in practical use, the Tg is preferably 0° C. or less, and may be −5° C. or less.

The first reactive monomer has a polymerizable functional group (first reactive group) that participates in a curing reaction. The first reactive monomer may be either a monofunctional compound having one first reactive group, or a multifunctional compound having two or more first reactive groups. The monofunctional compound and the multifunctional compound may be used in combination. The number of first reactive groups in the multifunctional compound is, for example, 2 to 8, and may be 2 to 4. From the viewpoint of ease of obtaining a linear polymer by polymerization of the first reactive monomer, it is preferable to use at least the monofunctional compound as the first reactive monomer. As a result of obtaining a linear polymer, high flexibility or extensibility can be easily ensured. From the viewpoint of ease of ensuring higher rubber elasticity, the average number of the first reactive groups per one molecule of the first reactive monomer is preferably 1 to 1.5, and more preferably 1 to 1.2. Only the monofunctional compound may be used as the first reactive monomer.

Examples of the first reactive group include a group having a polymerizable carbon-carbon unsaturated bond, and an epoxy group. Examples of the group having a polymerizable carbon-carbon unsaturated bond include, but are not limited to, a vinyl group, an allyl group, a dienyl group, an acryloyl group, and a methacryloyl group. Among the first reactive groups, a radically polymerizable functional group such as an acryloyl group and a methacryloyl group is preferable from the viewpoint of ease of achieving a high curing speed and excellent optical shaping properties. Note that an acryloyl group and a methaciyloyl group may herein sometimes be referred to as a (meth)acryloyl group.

Examples of the first reactive monomer include a vinyl-series monomer, an allyl-series monomer, an acrylic monomer, and an epoxy compound. Examples of the vinyl-series monomer include monomers having a vinyl group, including, for example, a vinyl ether of a hydroxy compound, an aromatic vinyl monomer (styrene, etc.), an alicyclic vinyl monomer, and a heterocyclic compound having a vinyl group (N-vinyl pyrrolidone, etc.). Examples of the allyl-series monomer include monomers having an allyl group, including, for example, an allyl ether of a hydroxy compound. Examples of the acrylic monomer include monomers having a (meth)aciyloyl group, including, for example, a (meth)acrylic acid ester of a hydroxy compound, an acid amide of a nitrogen-containing compound and a (meth) acrylic acid, and a (meth)acrylic acid. Note that acrylic acid and methacrylic acid may herein sometimes be referred to as a (meth)acrylic acid. An acrylic acid ester (or acrylate) and a methacrylic acid ester (or methacrylate) may occasionally be referred to as a (meth)acrylic acid ester (or (meth) acrylate).

The above-described hydroxy compound may be an aliphatic hydroxy compound, an aromatic hydroxy compound, an alicyclic hydroxy compound, or a heterocyclic hydroxy compound. The hydroxy compound may be either a monohydric alcohol or a polyol, but is preferably a monohydric alcohol or a dihydric alcohol (diol) from the viewpoint of ease of reducing the Tg of the cured product. The aliphatic hydroxy compound may have an aromatic ring, an aliphatic ring, and/or a heterocycle. The aliphatic ring may be a bridged ring. Note that when the hydroxy compound is a polyol in the first reactive monomer, all of the hydroxy groups may be etherified or esterified, or some of the hydroxy groups may be etherified or esterified.

The hydroxy compound may be an aliphatic alcohol, an alicyclic alcohol, an aromatic alcohol (or an aromatic hydroxy compound (including phenols)), a heterocyclic alcohol, or alkylene oxide adducts thereof. The aliphatic alcohol may have an aromatic ring, an aliphatic ring, or a heterocycle. The aliphatic ring may be a bridged ring. The number of hydroxy groups in these hydroxy compounds is one, or two or more, and preferably one or two.

Examples of the aliphatic alcohol include alkyl alcohols (alkyl alcohols such as methanol, ethanol, propanol, isopropanol, butanol, hexanol, lauryl alcohol, and stearyl alcohol), glycol (ethylene glycol, 1,3-propanediol, 1,4-butanediol), polyalkylene glycols (diethylene glycol, dipropylene glycol, tetramethylene glycol, etc.), benzyl alcohol, phenethyl alcohol, xylylene glycol, a monoester of phthalic acid and ethylene glycol, phenoxy ethyl alcohol, cyclohexane methanol, and cyclohexane dimethanol. Examples of the aliphatic alcohol include $C_{1-20}$ aliphatic alcohols, and the aliphatic alcohol may be a $C_{1-10}$ aliphatic alcohol, or a $C_{1-6}$ aliphatic alcohol (or a $C_{1-4}$ aliphatic alcohol). Examples of the alicyclic alcohol include alicyclic $C_{5-20}$ alcohols (an alicyclic $C_{5-10}$ alcohol, etc.) such as cyclohexanol, menthol, borneol, isobomeol, and dicyclopentanyl alcohol. Examples of the aromatic alcohol include aromatic $C_{6-10}$ alcohols such as phenol and naphthol.

Examples of the heterocyclic alcohol include alcohols having a heterocyclic group including a heteroatom as a constituent atom of the ring. Examples of the aliphatic alcohol having a heterocycle include an aliphatic alcohol having a heterocyclic group including a heteroatom as a constituent atom of the ring. Examples of these heterocyclic groups include 4- to 8-membered heterocyclic groups, and the heterocyclic group may be a 5- or 6-membered heterocyclic group. The heterocyclic group may be an unsaturated heterocyclic group, or a saturated heterocyclic group. Examples of the heteroatom include nitrogen, oxygen, and/or sulfur. Examples of the heterocycle corresponding to the heterocyclic group include oxygen-containing heterocycles (furan, tetrahydrofuran, oxolane, dioxolane, tetrahydropyran, dioxane, etc.), nitrogen-containing heterocycles (pyrrole, imidazoline, pyrrolidine, imidazole, piperidine, pyridine, etc.), sulfur-containing heterocycles (thiophene, tetrahydrothiophene, etc.), heterocycles including a plurality of kinds of heteroatoms (morpholine, thiazine, etc.). The aliphatic alcohol having a heterocyclic group is preferably a $C_{1-6}$ aliphatic alcohol having a heterocyclic group, or a $C_{1-4}$ aliphatic alcohol having a heterocyclic group.

Examples of the nitrogen-containing compound that forms an acid amide with a (meth)aciylic acid include an aliphatic amine (triethylamine, ethanolamine, etc.), an alicyclic amine (cyclohexyl amine, etc.), an aromatic amine (aniline, etc.), and a nitrogen-containing cyclic compound. Examples of the nitrogen-containing cyclic compound include pyrrole, pyrrolidine, piperidine, pyrimidine, morpholine, and thiazine. The nitrogen-containing cyclic compound is preferably a 5 to 8-membered ring, and may be a 5- or 6-membered ring.

The number of oxyalkylene groups included in one molecule of the alkylene oxide adduct is, for example, 1 or more and 10 or less, and may be 1 or more and 6 or less, or 1 or more and 4 or less. Examples of the oxyalkylene group include an oxy $C_{1-4}$ oxyalkylene group (an oxymethylene group, an oxyethylene group, an oxypropylene group, an oxytrimethylene group, etc.).

Of the first reactive monomers, examples of the vinyl-series monomer include a vinyl ether (e.g., a vinyl ether of a monohydric alcohol, etc.), and an alicyclic vinyl monomer. Examples of the allyl-series monomer include an allyl ether (an allyl ether of a monohydric alcohol, etc.).

Of the first reactive monomers, examples of the epoxy compound include compounds having an epoxy group (including, a compound having a glycidyl group). The epoxy compound may be, for example, an epoxy compound including an epoxy cyclohexane ring or a 2,3-epoxypropyloxy group.

The photocurable resin composition may include one first reactive monomer, or two or more first reactive monomers. From the viewpoint of ease of ensuring high optical shaping properties, the photocurable resin composition preferably includes at least an acrylic monomer.

From the viewpoint of ease of achieving higher flexibility and/or extensibility, and providing a high effect of suppressing the stress relaxation due to deformation, the first reactive monomer preferably includes a monofunctional acrylic monomer having a non-aromatic ring. With the use of such an acrylic monomer, the curing reaction is likely to proceed efficiently, and high optical shaping properties can be achieved, while the Tg can be easily kept low. The ratio of such an acrylic monomer to the whole reactive monomer is, for example, 80 mass % or more, and may be 90 mass % or more, or 95 mass % or more. The reactive monomer may be constituted only of such an acrylic monomer.

Examples of the monofunctional acrylic monomer having a non-aromatic ring include a monomer represented by the following formula (1):

[Chem. 1]

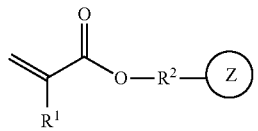

(1)

where $R^1$ is a hydrogen atom or a methyl group, $R^2$ is an alkylene group or an alkyleneoxy group, and Z is a non-aromatic ring including a heteroatom as a constituent atom of the ring.

The alkylene group represented by $R^2$ is, for example, a $C_{1-20}$ alkylene, and may be a $C_{1-10}$ alkylene, or a $C_{1-6}$ alkylene or a $C_{1-4}$ alkylene. Examples of the alkylene group include an alkylene group (e.g., methylene, ethylene, propylene, trimethylene, butylene, etc.) corresponding to the alkyl alcohols given as examples above. The alkyleneoxy group may be an alkyleneoxy group corresponding to an alkylene group. The alkyleneoxy group is preferably a $C_{1-4}$ alkyleneoxy group (a methyleneoxy group, an ethyleneoxy group, a propyleneoxy group, a trimethyleneoxy group, etc.). Note that the oxygen atom of the alkyleneoxy group is bonded to the ring Z.

Examples of the non-aromatic ring represented by the ring Z include an aliphatic ring and a heterocycle. The non-aromatic ring may be a bridged ring. The aliphatic ring is, for example, a 5- to 20-membered ring, and may be a 5- to 14-membered ring, or a 5- to 10-membered ring. Examples of the aliphatic ring include cyclohexane, cyclohexene, norbomane, norbomene, dicyclopentadiene, and tetrahydrodicyclopentadiene. Examples of the heteroatom included in the heterocycle (i.e., the ring Z) as a constituent atom of the ring include nitrogen, oxygen, and/or sulfur. Examples of the heterocycle include the heterocycles exemplified above for the heterocyclic alcohol. The ring Z may have a substituent. Examples of the substituent include an alkyl group, a hydroxy group, an oxo group (=O), a mercapto group, an amino group, and an alkoxy group. Examples of the alkyl group include a $C_{1-6}$ alkyl group, and the alkyl group may be a $C_{1-4}$ alkyl group. Examples of the alkyl group include methyl, ethyl, propyl, 2-propyl, and butyl. The alkyl group is preferably methyl, ethyl, or the like. Examples of the alkoxy group include alkoxy groups corresponding to the aforementioned alkyl groups.

The photocurable resin composition may include a reactive monomer (second reactive monomer) other than the first reactive monomer. The second reactive monomer is a reactive monomer whose cured product has a Tg of 20° C. or mores. The second reactive monomer has a polymerizable functional group (second reactive group) that participates in a curing reaction. The second reactive group can be selected from, for example, the groups described above for the first reactive group. However, the ratio of the second reactive monomer to the whole reactive monomer is preferably small. The ratio of the first reactive monomer to the whole reactive monomer is, for example, 80 mass % or more, and may be 90 mass % or more, or 95 mass % or more. The reactive monomer may be constituted only of the first reactive monomer.

(Reactive Oligomer)

As the reactive oligomer, an oligomer that can be cured or polymerized by the action of radicals, cations, and/or anions generated by light irradiation is used. As the reactive oligomer, at least a reactive oligomer (first reactive oligomer) whose cured product has a Tg of less than 20° C. is used. The Tg of the cured product of the first reactive oligomer may be less than 20° C., and is preferably 0° C. or less, more preferably −20° C. or less, and further preferably −25° C. or less, from the viewpoint of ease of stably ensuring high rubber elasticity in practical use.

The first reactive oligomer has a polymerizable functional group (third reactive group) that participates in a curing reaction. The third reactive group can be selected from the groups exemplified for the first reactive group. The first reactive oligomer may be a monofunctional oligomer having one third reactive group, but preferably includes at least a multifunctional oligomer having two or more third reactive groups, from the viewpoint of ease of ensuring high rubber elasticity. A multifunctional oligomer whose cured product has a Tg of less than 20° C. is likely to obtain high flexibility through curing, and it can be considered that, as a result of such an oligomer functioning as a crosslinking agent that crosslinks polymerized products of the reactive monomers, it is possible to promote the shrinkability of the cured product after extension while ensuring high extensibility thereof, thus ensuring even higher rubber elasticity. The number of the third reactive groups in the multifunctional oligomer is, for example, 2 to 8, and may be 2 to 4. From the viewpoint of ease of ensuring higher rubber elasticity, the average number of third reactive groups per one molecule of the multifunctional oligomer is preferably 1.5 to 2.5. For the same reason, at least a bifunctional reactive oligomer having two third reactive groups may be used, and the first reactive oligomer may be constituted only of the bifunctional reactive oligomer.

The Mw of the first reactive oligomer is, for example, 8,000 or more, and may be 10,000 or more. From the viewpoint of ease of ensuring high strength for the cured product, the Mw is more preferably greater than 10,000, and further preferably 11,000 or more, or 13,000 or more. The Mw of the first reactive oligomer is, for example, 40,000 or less, and may be 30,000 or less. When the Mw is in such a range, it is possible to increase the effect of suppressing the stress relaxation due to deformation, and uniformly mix the first reactive oligomer with the reactive monomer, so that high strength can be easily ensured. These lower and upper limit values can combined in any combination.

The Mw of the first reactive oligomer may be 8,000 or more and 40,000 or less (or 30,000 or less), 10,000 or more and 40,000 or less (or 30,000 or less), 11,000 or more and 40,000 or less (or 30,000 or less), or 13,000 or more and 40,000 or less (or 30,000 or less).

The first reactive oligomers may be used alone or in a combination of two or more. For example, first reactive oligomers of different kinds may be used in a combination of two or more, or first reactive oligomers that differ in Mw may be used in a combination of two or more.

From the viewpoint of ease of ensuring high optical shaping properties, the photocurable resin composition preferably includes a first reactive oligomer (acrylic oligomer) having a (meth)acryloyl group as the third reactive group. The content of the first reactive oligomer having a (meth) acryloyl group in the whole reactive oligomer is, for example, 80 mass % or more, and may be 90 mass % or more, or 95 mass % or more. The reactive oligomer may be constituted only of the first reactive oligomer having a (meth)acryloyl group.

Examples of the first reactive oligomer include (meth) acrylate of a polyhydroxy compound. Examples of the polyhydroxy compound include a polyalkylene glycol, an alkylene oxide adduct of an aliphatic polyol or an aliphatic polyamine (triethanolamine, ethylene diamine, etc.), an alkylene oxide adduct of an alicyclic polyol (hydrogenated bisphenols, etc.) or an alicyclic polyamine, an alkylene oxide adduct of an aromatic polyol (bisphenols, etc.) or an aromatic polyamine, and an oligomeric polyol. Examples of the aliphatic polyol include aliphatic polyols (glycerin, trimethylol propane, pentaerythritol, etc.) having three or more hydroxy groups, and saccharides (sorbitol, sucrose, etc.).

Examples of the oligomeric polyol include a polyether polyol, a polyester polyol, a polyether ester polyol, a polyurethane polyol, a polyester urethane polyol, a polyether urethane polyol, and a polycarbonate polyol. These polyols may have an aromatic ring, an aliphatic ring, and/or a heterocycle (e.g., a heterocycle including a heteroatom (oxygen, nitrogen, and/or sulfur, etc.) as a constituent element of the ring). From the viewpoint of ease of balancing the toughness and the strength of the cured product, (meth) acrylate of polyurethane polyol and/or (meth)acrylate of polyether urethane polyol may be used. When (meth)acrylate of a polyol having a urethane structure is used, it is also possible to increase the heat resistance.

The first reactive oligomer preferably includes a polyoxyalkylene chain. When a first reactive oligomer including a polyoxyalkylene chain is used, the crosslinking in portions other than the third reactive group is suppressed, so that a linear polymer can be easily obtained by polymerization of the reactive monomer. As a result of such a linear polymer and the first reactive oligomer reacting with each other, the effect of reducing the tan δ is increased, and the effect of suppressing the stress relaxation can be increased. Thus, a cured product excellent in extensibility and strength and having high shrinkability after extension can be easily obtained, so that higher rubber elasticity can be easily ensured.

Usually, a polyoxyalkylene chain is included in the polyhydroxy compound. For example, in the case of an alkylene oxide adduct, the portion including added alkylene oxide units is a polyoxyalkylene chain. Since a polyoxyalkylene chain is also included in polyalkylene glycol, an oligomeric polyol having a polyether chain (specifically, polyether polyol, polyether ester polyol, polyether urethane polyol, etc.), and the like, first reactive oligomers using such polyols are also preferable. Among these, an oligomeric polyol having a polyether chain (more specifically, a polyoxyalkylene chain) is preferable from the viewpoint of ensuring higher strength.

Examples of the polyoxyalkylene chain include a polyoxy $C_{2-4}$ alkylene chain. Examples of the polyoxyalkylene chain include a repeating structure of at least one oxyalkylene unit selected from oxyethylene, oxypropylene, oxytrimethylene, oxybutylene, and the like. The number of oxyalkylene groups included in one molecule of the first reactive oligomer is, for example, greater than 10, and may be 20 or more, or 50 or more. The upper limit of the number of oxyalkylene groups included in one molecule of the first reactive oligomer is not particularly limited, and can be selected according to the upper limit of the Mw of the first reactive oligomer, for example. The number of oxyalkylene groups included in one molecule of the first reactive oligomer is, for example, 800 or less, and may be 600 or less. These lower and upper limit values can be combined in any combination.

The number of oxyalkylene groups included in one molecule of the first reactive oligomer may be greater than 10 and less than or equal to 800 (less than or equal to 600), 20 or more and 800 or less (or 600 or less), or 50 or more and 800 or less (or 600 or less).

As the first reactive oligomer, a commercial product may be used, or an oligomer synthesized by a known method may be used. For example, an acrylic first reactive oligomer may be synthesized by esterifying a polyhydroxy compound (e.g., the above-described polyhydroxy compound) with (meth)acrylic acid, or may be synthesized by reacting (meth) acrylate having a hydroxy group ($CH_2$=CH(—$R^3$)—C(=O)O—$R^4$—OH) with an oligomer having a functional group capable of reacting with a hydroxy group. In the latter case, the oligomer moiety having a —O—$R^4$—O—$R^5$— group corresponds to the above-described polyhydroxy compound. Here, $R^3$ is a hydrogen atom or a methyl group, $R^4$ is a divalent organic group (an alkylene group, etc.), and $R^5$ is a residue formed from the reaction of the above-described functional group with a hydroxy group. For example, an acrylic oligomer having a urethane structure can be obtained by introducing an isocyanate group to a terminal of a polyhydroxy compound (among the above-described polyhydroxy compounds, polyether polyol, polyester polyol, polyether ester polyol, polycarbonate polyol, etc.) by reaction of the polyhydroxy compound with polyisocyanate, and reacting the introduced isocyanate group at the terminal with (meth)acrylate having a hydroxy group. Examples of the polyisocyanate include, but are not particularly limited to, an aliphatic polyisocyanate (non-yellowing polyisocyanate, etc.), an aromatic polyisocyanate (yellowing polyisocyanate, etc.), and/or a hardly yellowing polyisocyanate. Although the (meth)acrylate having a hydroxy group may be any of aromatic, alicyclic, and aliphatic (meth)acrylates, hydroxyalkyl (meth)acrylate (hydroxy $C_{1-6}$ alkyl(meth)acrylate (hydroxyethyl (meth)acrylate, etc.) etc.) is often used. The reactions are well known, and known reaction conditions may be adopted.

The photocurable resin composition may include a reactive oligomer (second reactive oligomer) other than the first reactive oligomer. The second reactive oligomer is a reactive oligomer whose cured product has a Tg of 20° C. or more. The second reactive oligomer has a polymerizable functional group (fourth reactive group) that participates in a curing reaction. The fourth reactive group can be selected, for example, from the groups described for the first reactive group. However, the ratio of the second reactive oligomer to the whole reactive oligomer is preferably small. The ratio of the first reactive oligomer to the whole reactive oligomer is, for example, 80 mass % or more, and may be 90 mass % or more, or 95 mass % or more. The reactive oligomer may be constituted only of the first reactive oligomer.

The content of the reactive oligomer in the photocurable resin composition is, for example, 15 mass % or more, and may be 20 mass % or more, or 30 mass % or more. When the content of the reactive oligomer is in such a range, it is possible to ensure a high curing speed while suppressing the strain during curing. In addition, it is possible to further increase the strength of the cured product. The content of the reactive oligomer in the photocurable resin composition is, for example, 80 mass % or less, and may be 60 mass % or less. When the content of the reactive oligomer is in such a range, the viscosity of the photocurable resin composition can be easily adjusted. These lower and upper limit values can be combined in any combination.

The content of the reactive oligomer in the photocurable resin composition may be 15 mass % or more and 80 mass % or less (or 60 mass % or less), 20 mass % or more and 80 mass % or less (or 60 mass % or less), or 30 mass % or more and 80 mass % or less (or 60 mass % or less).

In the photocurable resin composition, the mass ratio (=reactive monomer /reactive oligomer) between the first reactive monomer and the first reactive oligomer is, for example, 20/80 to 80/20, and may be 25/75 to 70/30, or 30/70 to 70/30. When the mass ratio between the first reactive monomer and the first reactive oligomer is in such a range, it is possible to easily ensure high strength for the cured product, and increase the effect of suppressing the stress relaxation due to deformation. When a first reactive oligomer having a polyoxyalkylene chain is used, excessive increase in viscosity of the photocurable resin composition can be easily suppressed. Accordingly, in such a case, even when the above-described mass ratio is, for example, 20/80 to 50/50 or 30/70 to 50/50, or in other word, when the ratio of the first reactive oligomer is large, it is possible to ensure high optical shaping properties, and obtain excellent rubber elasticity for the cured product.

The content of the first reactive oligomer in the photocurable resin composition is, for example, greater than 20 mass %, and preferably 25 mass % or more. When the content of the first reactive oligomer is in such a range, it is possible to ensure higher strength for the cured product, in addition to easily ensuring a high curing speed. The content of the first reactive oligomer is, for example, less than 80 mass %, and preferably 75 mass % or less. When the content of the first reactive oligomer is in such a range, the curing reaction proceeds more easily, and the viscosity of the photocurable resin composition can be easily kept low. These lower and upper limit values can be combined in any combination.

The content of the first reactive oligomer in the photocurable resin composition may be greater than 20 mass % and less than 80 mass % (or 75 mass % or less), or 25 mass % or more and less than 80 mass % (or 75 mass % or less).

(Photopolymerization Initiator)

The photopolymerization initiator included in the photocurable resin composition is activated by the action of light, and initiates curing (specifically, polymerization) of the photocurable monomer. Examples of the photopolymerization initiator include, in addition to a radical polymerization initiator that generates radicals by the action of light, and an agent that produces an acid (or cation) by the action of light (specifically, a cation generator). The photopolymerization initiators may be used alone or in a combination of two or more. The photopolymerization initiator is selected according to the type of the polymerizable compound, for example, whether the polymerizable compound is radically polymerizable or cationically polymerizable. Examples of the radical polymerization initiator (radical photopolymerization initiator) include an alkylphenone-series photopolymerization initiator, and an acylphosphine oxide-series photopolymerization initiator.

Examples of the alkylphenone-series photopolymerization initiator include 2,2-dimethoxy-1,2-diphenyl ethan-1-one, 1-hydroxy-cyclohexyl-phenyl-ketone, 2-hydroxy-2-methyl-1-phenyl-propan-1-one, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, 2-methyl-1-(4-methylthiophenyl)-2-morpholinopropan-1-one, 2-benzyl-2-dimethylamino-1-(4-morpholinophenyl)-butanone-1, and 2-(dimethylamino)-2-[(4-methyl phenyl)methyl]-1-[4-(4-morpholinyl)phenyl]-1-butanone.

Examples of the acylphosphine oxide-series photopolymerization initiator include 2,4,6-trimethylbenzoyl-diphenyl-phosphine oxide, and bis(2,4,6-trimethylbenzoyl)-phenyl-phosphine oxide.

However, these photopolymerization initiators are merely illustrative, and the photopolymerization initiator is not limited thereto.

(Ceramic Particles)

When the photocurable resin composition include ceramic particles, it is possible to further improve the extensibility of the cured product, and ensure higher strength. Accordingly, it is possible to obtain a cured product having better rubber elasticity. Usually, ceramic particles have a functional group (first functional group) such as an inorganic hydroxy group on the surface thereof. As a result of the first functional group interacting with the reactive monomer, the reactive oligomer, or polymerized products thereof by hydrogen bonding or the like, a pseudo crosslinking point is formed, thus making it possible to increase the extensibility and/or strength.

Examples of the ceramic particles include silica particles, titania particles, alumina particles, and zirconia particles. The photocurable resin composition may include one kind of the ceramic particles, or a combination of two or more kinds thereof. From the viewpoint of ease of achieving high transparency, the ceramic particles preferably include at least silica particles.

From the viewpoint of ease of ensuring high rubber elasticity by being uniformly dispersed in the photocurable resin composition, it is preferable to use monodisperse (e.g., colloidal) ceramic particles.

The average particle size of the ceramic particles may be 10 μm or less, 1 μm or less, or 500 nm or less. From the viewpoint of ease of ensuring higher extensibility and strength by being uniformly dispersed in the photocurable resin composition, the average particle size of the ceramic particles is preferably 100 nm or less. The average particle size of the ceramic particles may be 5 nm or more, or 10 nm or more.

The average particle size of the ceramic particles may be 5 nm or more (or 10 nm or more) and 10 μm or less, 5 nm or more (or 10 nm or more) and 1 μm or less, 5 nm or more (or 10 nm or more) and 500 nm or less, 5 nm or more (or 10 nm or more) and 100 nm or less, 5 nm or more (or 10 nm or more) and 10 μm or less, 5 nm or more (or 10 nm or more) and 1 μm or less, 5 nm or more (or 10 nm or more) and 500 nm or less, or 5 nm or more (or 10 nm or more) and 100 nm or less.

As used herein, the average particle size is determined as a particle diameter (D50) at a cumulative volume of 50% of a volume-based particle size distribution, as measured using a laser diffraction scattering particle size distribution measurement apparatus. Note that when the average particle size is 100 nm or less, the average particle size is determined using a particle size distribution measurement apparatus by dynamic light scattering.

The shape of the ceramic particles is not particularly limited, and may be any of, for example, a spherical shape (including, an elliptical spherical shape), a rod-like shape, a flake-like shape, a prismatic shape, and an amorphous shape. From the viewpoint of being easily uniformly dispersed in the photocurable resin composition, it is preferable to use spherical ceramic particles.

The ceramic particles may have an organic functional group (hereinafter referred to as a "surface functional group" or a "second functional group") on the surface thereof. With the second functional group, the degree of interaction with the reactive monomer, the reactive oligomer, or polymerized products thereof can be controlled, so that it is possible to ensure higher extensibility and/or strength (in particular, extensibility). The second functional group can be introduced into the first functional group by using a coupling agent, for example. Examples of the coupling agent include a silane coupling agent, a titanium coupling agent, an aluminum coupling agent, and a zirconium coupling agent.

Examples of the second functional group include a hydrocarbon group, a halogenated hydrocarbon group, an acryloyloxyalkyl group, a methacryloyloxyalkyl group, and an alkoxy group. Among these, a hydrocarbon group, a halogenated hydrocarbon group, an acryloyloxyalkyl group, a methacryloyloxyalkyl group, and the like are more preferable as the second functional group. Examples of the hydrocarbon group or a hydrocarbon group that constitutes a halogenated hydrocarbon group include a saturated or unsaturated aliphatic hydrocarbon group and an aromatic hydrocarbon group. Examples of the saturated aliphatic hydrocarbon group include an alkyl group (e.g., a $C_{1-10}$ alkyl group or a $C_{1-6}$ alkyl group). Examples of the unsaturated aliphatic hydrocarbon group include an unsaturated aliphatic hydrocarbon group (a vinyl group, an allyl group, a propargyl group, etc.) having 2 to 10 carbon atoms or 2 to 6 carbon atoms. Examples of the aromatic hydrocarbon group include an aryl group (e.g., a $C_{6-10}$ aryl group (a phenyl group, etc.)), and an aryl group (e.g., a $C_{6-10}$ aryl group) having an unsaturated aliphatic hydrocarbon group (e.g., an unsaturated aliphatic hydrocarbon group having 2 to 10 carbon atoms or 2 to 6 carbon atoms) (a styryl group, etc.). Examples of the halogen atom included in the halogenated hydrocarbon group include a fluorine atom and a chlorine atom. Examples of the alkyl group that constitutes the acryloyloxyalkyl group and the methacryloyloxyalkyl group include a $C_{1-10}$ alkyl group and a $C_{1-6}$ alkyl group. Specific examples of the alkyl group include, but are not limited to, a methyl group, an ethyl group, a propyl group, and a butyl group. Examples of the alkoxy group include a $C_{1-6}$ alkoxy group and a $C_{1-4}$ alkoxy group (a methoxy group, an ethoxy group, a propoxy group, etc.). The ceramic particles may have one kind of the second functional groups, or may have a combination of two or more kinds thereof.

The ceramic particles preferably include, as the second functional group, at least one selected from the group consisting of an aromatic hydrocarbon group, a vinyl group, an acryloyloxyalkyl group, and a methacryloyloxyalkyl group. When the ceramic particles have an aromatic hydrocarbon group (in particular, an aromatic hydrocarbon group that does not have an unsaturated aliphatic hydrocarbon group), it is possible to ensure even higher extensibility by the π-π interaction of the aromatic hydrocarbon rings. When the ceramic particles have a vinyl group, an acryloyloxyalkyl group and/or a methacryloyloxyalkyl group, it is possible, by the action of the polymerizable unsaturated bond, to easily ensure higher strength while ensuring high extensibility.

The content of the ceramic particles in the photocurable resin composition is, for example, 0.1 mass % or more. From the viewpoint of ease of ensuring higher extensibility and strength, the content of the ceramic particles may be 1 mass % or more, or 5 mass % or more. From the viewpoint of ease of ensuring higher flexibility for the cured product, the content of the ceramic particles is preferably 50 mass % or less, and may be 40 mass % or less.

The content of the ceramic particles in the photocurable resin composition may be 0.1 mass % or more and 50 mass % or less (or 40 mass % or less), 1 mass % or more and 50 mass % or less (or 40 mass % or less), or 5 mass % or more and 50 mass % or less (or 40 mass % or less).

(Others)

The photocurable resin composition may further include other known curable resins and the like. The photocurable resin composition can include a thiol compound, an amine compound, and/or a known additive (e.g., a colorant, an antioxidant, an antifoaming agent, a filler, a stabilizer, etc.).

The viscosity at 25° C. of the photocurable resin composition is, for example, 30 mPa·s or more and 7,000 mPa·s or less (or 3,000 mPa·s or less). When the photocurable resin composition has such a viscosity, it is possible to adopt various shaping methods, and increase the precision of the optical shaped object. It is also possible to enhance the workability. From the viewpoint of ease of achieving higher rubber elasticity, the viscosity at 25° C. of the photocurable resin composition is preferably 100 mPa·s or more and 3,000 mPa·s or less, more preferably 200 mPa·s or more and 3,000 mPa·s or less, and may be 400 mPa·s or more and 3,000 mPa·s or less.

The loss tangent tan δ at 25° C. of a cured product (more specifically, a photocured product) of the photocurable resin composition may be 0.2 or less, preferably 0.15 or less, and more preferably 0.14 or less. When the tan δ is in such a range, it is possible to ensure excellent rubber elasticity for the cured product.

The Tg of the cured product is less than 20° C. From the viewpoint of ease of stably ensuring high rubber elasticity in practical use, the Tg is preferably 5° C. or less, and more preferably 0° C. or less, or −5° C. or less.

According to the present invention, it is possible to ensure high rubber elasticity for the cured product. When the rubber elasticity of the cured product is high, the elongation at break in accordance with ASTM D638 of the cured product is increased. The elongation at break in accordance with ASTM D638 of the cured product of the photocurable resin composition is 150% or more, and preferably 160% or more, or 200% or more, and it is also possible to achieve an elongation of 300% or more, 400% or more, or 500% or more. The upper limit of the elongation at break is not particularly limited, but is, for example, 1000% or less, and may be 900% or less, 800% or less, 700% or less, 600% or less, 500% or less, or 400% or less. These lower and upper limit values can be combined in any combination.

The elongation at break in accordance with ASTM D638 of the cured product of the photocurable resin composition may be 150% or more (or 160% or more) and 1000% or less, 150% or more (or 160% or more) and 900% or less, 150% or more (or 160% or more) and 800% or less, 150% or more (or 160% or more) and 700% or less, 150% or more (or 160% or more) and 600% or less, 150% or more (or 160% or more) and 500% or less, 150% or more (or 160% or more) and 400% or less, 200% or more (or 300% or more) and 1000% or less, 200% or more (or 300% or more) and 900% or less, 200% or more (or 300% or more) and 800% or less, 200% or more (or 300% or more) and 700% or less, 200% or more (or 300% or more) and 600% or less, 200% or more (or 300% or more) and 500% or less, 200% or more (or 300% or more) and 400% or less, 400% or more (or 500% or more) and 1000% or less, 400% or more (or 500% or more) and 900% or less, 400% or more (or 500% or more) and 800% or less, 400% or more (or 500% or more) and 700% or less, 400% or more (or 500% or more) and 600% or less, or 400% or more and 500% or less.

It is also possible to ensure high strength for the cured product. The breaking strength in accordance with ASTM D638 of the cured product is, for example, 0.5 MPa or more, and may be 0.7 MPa or more or 0.8 MPa or more, or 1 MPa or more or 1.5 MPa or more, and it is also possible to achieve a strength of 2 MPa or more or 3 MPa or more. The upper limit of the breaking strength is not particularly limited, but is preferably 5 MPa or less or 4.5 MPa or less, from the viewpoint of ease of ensuring high elongation at break, or may be 4 MPa or less or 3 MPa or less. These lower and upper limit values can be combined in any combination.

The breaking strength in accordance with ASTM D638 of the cured product of the photocurable resin composition may be 0.5 MPa or more and 5 MPa or less (or 4.5 MPa or less), 0.7 MPa or more and 5 MPa or less (or 4.5 MPa or less), 0.8 MPa or more and 5 MPa or less (or 4.5 MPa or less), 1 MPa or more and 5 MPa or less (or 4.5 MPa or less), 1.5 MPa or more and 5 MPa or less (or 4.5 MPa or less), 2 MPa or more and 5 MPa or less (or 4.5 MPa or less), 3 MPa or more and 5 MPa or less (or 4.5 MPa or less), 0.5 MPa or more and 4 MPa or less (or 3 MPa or less), 0.7 MPa or more and 4 MPa or less (or 3 MPa or less), 0.8 MPa or more and 4 MPa or less (or 3 MPa or less), 1 MPa or more and 4 MPa or less (or 3 MPa or less), 1.5 MPa or more and 4 MPa or less (or 3 MPa or less), 2 MPa or more and 4 MPa or less (or 3 MPa or less), or 3 MPa or more and 4 MPa or less.

The breaking strength is measured using a test piece formed of a cured product of the photocurable resin composition. As the test piece, the same test piece as that used for the measurement of the elongation at break can be used. As for the measurement condition as well, the same conditions as those for the elongation at break are used.

The cured product also has high flexibility. The flexibility can be evaluated by the Shore A hardness. The Shore A hardness at 23° C. of the cured product of the photocurable resin composition is preferably 100 or less, more preferably 60 or less, or 50 or less, and may be 40 or less. The lower limit of the Shore A hardness is not particularly limited, but is preferably 15 or more, and may be 20 or more, from the viewpoint of ensuring a certain degree of strength. These lower and upper limit values can be combined in any combination.

The Shore A hardness at 23° C. of the cured product of the photocurable resin composition may be 15 or more (or 20 or more) and 100 or less, 15 or more (or 20 or more) and 60 or less, 15 or more (or 20 or more) and 50 or less, or 15 or more (or 20 or more) and 40 or less.

Even when the elongation at break of the cured product is high, the viscosity is increased if the stress generated when the cured product is deformed by a force applied thereto is relaxed, resulting in an insufficient effect of improving the rubber elasticity. Therefore, the stress relaxation of the cured product is preferably small. The degree of the stress relaxation can be evaluated by the difference D ($=r_0-r_1$) between the initial Shore A hardness $r_0$ measured when the indenter of the durometer is pushed into the cured product and the Shore A hardness $r_1$ measured when 15 seconds has elapsed in the pushed state, at the time of measuring the Shore A hardness. The difference D between the Shore A hardnesses is preferably small. The difference D is preferably 2 or less, more preferably 1 or less, and further preferably less than 0.5, or 0.1 or less.

The photocurable resin composition can be obtained by mixing the constituent components. The photocurable resin composition may be one-pot curable or two-pot curable.

The photocurable resin composition is suitable for being cured by light irradiation to form a three-dimensional optical shaped object (cured product). The present invention also encompasses a photocured product (in particular, a three-dimensional optical shaped object) of the photocurable resin composition.

[Optical Shaped Object]

The present invention also encompasses a photocured product (optical shaped object) of the photocurable resin composition. The optical shaped object is preferably a three-dimensional optical shaped object that can exhibit excellent rubber elasticity. The optical shaped object has the physical properties described for the cured product of the photocurable resin composition.

Such an optical shaped object can be used in various applications that require high rubber elasticity, and is particularly useful as an elastic member. The elastic member can also be used as an alternative to a rubber and an elastomer. Although the applications of the elastic member are not particularly limited, the elastic member may be used, for example, in applications that require shock absorbing properties, vibration isolation, vibration control, and the like. Examples of the applications of the elastic member include, but are not limited to, an electronic device, an electric device, a medical device, an electrical appliance, a robot-related product, a vehicle-related product (a device and a component mounted in a vehicle, an ECU, a smart key, etc.), shoes (a cushion material etc.), a mat, gloves, a helmet, a protector, a grip (a bicycle grip, a pen grip, etc.), a watch module, a suitcase, and a low-resilience material. Note that examples of the cushion material of shoes include the materials incorporated in an insole and a midsole of shoes.

The three-dimensional optical shaped object can be produced, for example, by a production method including: a step (i) of forming a liquid film of a photocurable resin composition, and curing the liquid film, to form a pattern; a step (ii) of forming an additional liquid film in contact with the pattern; and a step (iii) of curing the additional liquid film on the pattern, to laminate an additional pattern.

A description will be given below of an example of procedures of vat-using optical shaping.

FIG. 1 shows an exemplary case of forming a three-dimensional shaped-object by using an optical shaping apparatus (patterning apparatus) including a resin tank (vat). Although the illustrated example shows a suspension-type shaping, any method may be employed that can perform three-dimensional optical shaping using the photocurable resin composition. The light irradiation (exposure) is not limited to a specific style, and may be point exposure or plane exposure.

A patterning apparatus 1 includes a platform 2 having a pattern forming surface 2a, a resin tank 3 containing a photocurable resin composition 5, and a projector 4 serving as a light source of plane exposure.

(i) Step of Forming Liquid Film, and Curing Liquid Film to Form Pattern

In the step (i), as shown in (a), first, the pattern forming surface 2a of the platform 2, while being faced to the projector 4 (i.e., the bottom surface of the resin tank 3), is submerged in the photocurable resin composition 5 contained in the resin tank 3. At this time, the height of the pattern forming surface 2a (or the platform 2) is adjusted such that a liquid film 7a (liquid film a) can be formed between the pattern forming surface 2a and the projector 4 (or the bottom surface of the resin tank 3). Next, as shown in (b), the liquid film 7a is irradiated with (plane-exposed to) light L emitted from the projector 4 and cured into a pattern 8a (pattern a).

In the patterning device 1, the resin tank 3 serves as a supply unit for supplying the photocurable resin composition 5. The resin tank is desirably optically clear to the exposure wavelength, at least at a portion present between the liquid film and the projector 4 (in the illustrated example, the portion is the bottom), so that the liquid film can be irradiated with light emitted from the light source. The shape, material, size and the like of the platform 2 are not specifically limited.

After the liquid film a is formed, the liquid film a is photocured by light irradiation from the light source toward the liquid film a. The light irradiation can be performed by any known method. There is no particular limitation on the exposure technique, and it is possible to use point exposure or surface exposure. The light source may be any known light source used for photocuring. In the case of point exposure, for example, a plotter, a galvano laser (or galvano scanner), an SLA (stereolithography), or the like can be used. In the case of a plane exposure system, a projector can be conveniently used as a light source. Examples of the projector include LCD (transmission-type liquid crystal), LCoS (reflection-type liquid crystal), and DLP (registered trademark, Digital Light Processing) projectors. The exposure wavelength can be selected as appropriate, according to the kind and the like of the constituent components (in particular, the type of the initiator) of the photocurable resin composition.

(ii) Step of Forming Liquid Film between Pattern a and Light Source

In the step (ii), the photocurable resin composition is supplied between the pattern a obtained in the step (i) and the light source, to form a liquid film (liquid film b). In short, a liquid film b is formed on the pattern a formed on the pattern forming surface. For the supply of the photocurable resin composition, the description of the step (i) can be referred to.

For example, in the step (ii), as shown in (c) in FIG. 1, after the two-dimensional pattern 8a (two-dimensional pattern a) is formed, the pattern formation surface 2a may be lifted together with the platform 2. Along therewith, the photocurable resin composition 5 is supplied between the two-dimensional pattern 8a and the bottom surface of the resin tank 3. Thus, a liquid film 7b (liquid film b) can be formed.

(iii) Step of Laminating Additional Pattern b on Pattern a

In the step (iii), the liquid film b formed in the step (ii) is exposed to light from the light source, so that the liquid film b is photocured. Thus, another pattern (pattern b obtained by photocuring of the liquid film b) is laminated on the pattern a. By laminating patterns one after another in the thickness direction in this way, a three-dimensional shaped-pattern can be formed.

For example, as shown in (d) in FIG. 1, the liquid film 7b (liquid film b) formed between the pattern 8a (pattern a) and the bottom surface of the resin tank 3 is exposed to light emitted from the projector 4, so that the liquid film 7b is photocured. This photocuring converts the liquid film 7b into a pattern 8b (pattern b). In this way, the pattern 8b can be laminated on the pattern 8a.

For the light source, exposure wavelength and the like, the description of the step (i) can be referred to.

(iv) Step of Repeating Step (ii) and Step (iii)

The production method can include a step (iv) of repeating the steps (ii) and (iii) a plurality of times. Through this step (iv), a plurality of patterns b are laminated in the thickness direction, and a more three-dimensional shaped-pattern can be obtained. The number of times of repeating can be determined as appropriate according to the shape, size, and the like of a desired three-dimensional shaped-object (three-dimensional shaped-pattern).

For example, as shown in (e) in FIG. 1, the platform 2, with the pattern 8a (pattern a) and the pattern 8b (pattern b) laminated on the pattern forming surface 2a, is lifted. Along therewith, the liquid film 7b (liquid film b) is formed between the pattern 8b and the bottom surface of the resin tank 3. Then, as shown in (f) in FIG. 1, the liquid film 7b is exposed to light emitted from the projector 4, so that the liquid film 7b is photocured. This forms another pattern 8b (pattern b) on the pattern 8b. By repeating (e) and (f) alternately, a plurality of the patterns 8b (two-dimensional patterns b) can be laminated.

The three-dimensional shaped-pattern obtained as a final product in the step (iii) or (iv) has some uncured photocurable resin composition attached thereto, and therefore, is usually subjected to cleaning with a solvent.

The three-dimensional shaped-pattern obtained in the step (iii) or (iv) may be optionally subjected to post-curing. The post-curing can be performed by irradiating the pattern with light. The conditions of light irradiation can be adjusted as appropriate according to the kind of the photocurable resin composition, the degree of curing of the obtained pattern, and the like. The post-curing may be performed on a part of the pattern, and may be performed on the whole thereof.

EXAMPLES

Hereinafter, the present invention will be specifically described by way of examples and comparative examples. However, the present invention is not limited to the following examples.

Examples 1 to 21 and Comparative Examples 1 to 7

(1) Preparation of Photocurable Resin Composition

Of the components shown in Tables 1 to 4, the reactive monomers, the reactive oligomers, and the polymerizable initiators were mixed at the mass ratios shown in Tables 2 to 4, and the mixtures were heated in an oven at 80° C. under stirring, to dissolve the solid components, thereby preparing uniform liquid mixtures. In Examples 13 to 21, the ceramic particles shown in Tables 1 and 4 were further added to the liquid mixtures, and then mixed. Thus, photocurable resin compositions were prepared.

(2) Evaluation

The photocurable resin compositions obtained in (1) above or the components used for the photocurable resin compositions were evaluated in the following manner.

(a) Viscosity

The viscosity of each of the photocurable resin compositions was measured using an E type viscometer (TVE-20H, Told Sangyo Co., Ltd.), at 25° C. and a rotational speed of 20 rpm.

(b) Tg, Elastic Modulus, and Tan δ

Each of the photocurable resin compositions was poured into a tray, and a liquid film having a thickness of 500 μm was formed. Both principal surfaces of the liquid film were irradiated with LED light having a wavelength of 405 nm, to completely cure the liquid film, thereby producing a sample of a cured product. As the tray, a tray that transmits the above-described LED light was used.

The obtained sample was heated from −100° C. to +100° C. by using a DMA (DMS 6100, manufactured by Hitachi High-Tech Science Corporation), at a frequency of 1 Hz and a temperature rising rate of 5° C./min. Then, the elastic modulus (storage modulus) (MPa) at 25° C. and the tan δ were determined, and the temperature at which the tan δ was at the top peak was determined as the Tg of the cured product of the photocurable resin composition.

In addition, using each of the reactive monomer and the reactive oligomer in place of the photocurable resin composition, the Tg of a cured product of the reactive monomer and the Tg of a cured product of the reactive oligomer were determined in the same manner as described above.

(c) Elongation at Break and Breaking Strength

The liquid film of the photocurable resin composition was irradiated with LED light having a wavelength of 405 nm, to completely cure the liquid film, thereby producing the previously described test piece. Using this test piece, the elongation at break (%) and the breaking strength (MPa) were measured in accordance with ASTM D638, under the previously described conditions.

(d) Shore A Hardness and Stress Relaxation

A strip-shaped sample (length: 40 mm, width: 20 mm, thickness (height): 4 mm) by using a DLP (registered trademark) 3D printer (ML-48 manufactured by MUTOH INDUSTRIES LTD.), for a irradiation time per layer of 30 seconds and with a z-axis (height direction) pitch of 100 μm. For this sample, the Shore A hardness was measured under a load of 1 kg by using a type-A durometer, in accordance with JIS K 6253:2012. Note that as the Shore A hardness, the initial Shore A hardness $r_0$ when the indenter of the durometer was pushed into the sample, and the Shore A hardness $r_1$ after an elapse of 15 seconds in the pushed state were measured. The stress relaxation was evaluated as "Absent" when the difference D ($=r_0-r_1$) between these Shore A hardnessess was 2 or less, and evaluated as "Present" when the difference was greater than 2.

The results of the evaluation of the examples and the comparative examples are shown in Tables 2 to 4. Table 1 shows the components used in the examples and the comparative examples.

TABLE 1

| | | Structure or type | Tg (° C.) | Mw |
|---|---|---|---|---|
| Reactive monomer | Monomer 1 | $CH_2=CH-\overset{O}{\underset{\|}{C}}-O-CH_2-\langle\text{phenyl}\rangle-O-\langle\text{phenyl}\rangle$ | −35 | |
| | Monomer 2 | $CH_2=CH-\overset{O}{\underset{\|}{C}}-O-C_2H_4-O-\langle\text{phenyl}\rangle-C_9H_{17}$ | 5 | |
| | Monomer 3 | $H_2C=\overset{H}{\underset{\|}{C}}-\overset{O}{\underset{\|}{C}}-O-CH_2-\langle\text{dioxolane with ethyl}\rangle$ | −7 | |
| | Monomer 4 | 4-hydroxybutyl acrylate | −32 | |
| Reactive oligomer | Oligomer 1 | Aliphatic urethane acrylate, bifunctional | −55 | 1500 |
| | Oligomer 2 | Aliphatic urethane acrylate, bifunctional | −27 | 5000 |
| | Oligomer 3 | Ether type urethane acrylate, bifunctional | −30 | 13000 |
| | Oligomer 4 | Ester type urethane acrylate, bifunctional | −39 | 18000 |
| | Oligomer 5 | Yellowing urethane acrylate, bifunctional | −38 | 13000 |
| | Oligomer 6 | Aromatic urethane acrylate, bifunctional | −32 | 19000 |
| | Oligomer 7 | Aliphatic urethane acrylate, bifunctional | −76 | 19000 |
| | Oligomer 8 | Polyether urethane acrylate, bifunctional | −55 | 11000 |
| | Oligomer 9 | Polyether urethane acrylate, bifunctional | −55 | 25000 |

TABLE 1-continued

|  | | Structure or type | Tg (° C.) | Mw |
|---|---|---|---|---|
| Ceramic particles | Silica particles 1 | Colloidal silica, average particle size: 50 nm, surface functional group: phenyl | | |
|  | Silica particles 2 | Colloidal silica, average particle size: 10 nm, surface functional group: phenyl | | |
|  | Silica particles 3 | Colloidal silica, average particle size: 50 nm, surface functional group: methacryloxy alkyl | | |
|  | Silica particles 4 | Colloidal silica, average particle size: 10 nm, surface functional group: methacryloxy alkyl | | |
|  | Silica particles 5 | Colloidal silica, average particle size: 50 nm, surface functional group: vinyl | | |
| Photopolymerization initiator | Initiator 1 | 2,4,6-trimethylbenzoyl-diphenyl-phosphine oxide | | |
|  | Initiator 2 | bis(2,4,6-trimethylbenzoyl)-phenyl-phosphine oxide | | |

TABLE 2

|  |  | Tg (° C.) | Mw | Comparative examples | | | | | | |
|---|---|---|---|---|---|---|---|---|---|---|
|  |  |  |  | 1 | 2 | 3 | 4 | 5 | 6 | 7 |
| Reactive monomer | Monomer 1 | −35 | | | | | 70 | | | |
|  | Monomer 2 | 5 | | | | | | 70 | | |
|  | Monomer 3 | −7 | | 70 | 50 | 70 | | | 95 | 90 |
| Reactive oligomer | Oligomer 1 | −55 | 1500 | | | | 30 | | | |
|  | Oligomer 2 | −27 | 5000 | 30 | 50 | | | | | |
|  | Oligomer 3 | −30 | 13000 | | | | | | | |
|  | Oligomer 4 | −39 | 18000 | | | | | | | |
|  | Oligomer 5 | −38 | 13000 | | | | | | | |
|  | Oligomer 6 | −32 | 19000 | | | | 30 | 30 | 5 | 10 |
| Photopolymerization initiator | Initiator 1 | | | | | | 4 | | | |
|  | Initiator 2 | | | 3 | 3 | 3 | | 3 | 3 | 3 |
| Evaluation | Viscosity (mPa · s) | | | 91 | 342 | 54 | 707 | 308 | 11 | 24 |
|  | Shore A hardness | Initial $r_0$ | | 38 | 45 | 48 | 23 | 38 | 5 | 10 |
|  |  | Post-15 s $r_1$ | | 38 | 45 | 48 | 16 | 25 | 1 | 5 |
|  | Stress relaxation | | | Absent | Absent | Absent | Present | Present | Present | Present |
|  | Elongation at break (%) | | | 58 | 120 | 138 | 486 | 475 | 743 | 500 |
|  | Breaking strength (MPa) | | | 0.4 | 1 | 1.8 | 2.9 | 2.1 | 0.54 | 0.8 |
|  | Storage modulus | 25° C. | | 0.98 | 1.4 | 2.2 | 1.4 | 1.2 | 0.35 | 0.42 |
|  | tan δ | 25° C. | | 0.06 | 0.02 | 0.12 | 0.78 | 0.56 | 0.7 | 0.4 |
|  | Tg (° C.) | | | −9.8 | −16.8 | 1.2 | 12.2 | 10.2 | −0.8 | −2.8 |

TABLE 3

|  |  | Tg (° C.) | Mw | Examples | | | | | | | | | | | |
|---|---|---|---|---|---|---|---|---|---|---|---|---|---|---|---|
|  |  |  |  | 1 | 2 | 3 | 4 | 5 | 6 | 7 | 8 | 9 | 10 | 11 | 12 |
| Reactive monomer | Monomer 3 | −7 | | 70 | 60 | 70 | 70 | 70 | 70 | 60 | 50 | 30 | | | 55 |
|  | Monomer 4 | −32 | | | | | | | | | | | 70 | 55 | |
| Reactive oligomer | Oligomer 3 | −30 | 13000 | | | | 30 | | | 40 | | | | 45 | |
|  | Oligomer 4 | −39 | 18000 | | | | | 30 | | | | | | | |
|  | Oligomer 5 | −38 | 13000 | | | | | | 30 | | | | | | |
|  | Oligomer 6 | −32 | 19000 | 30 | 40 | | | | | | | | 30 | | |
|  | Oligomer 7 | −76 | 19000 | | | 30 | | | | | | | | | |
|  | Oligomer 8 | −55 | 11000 | | | | | | | | 50 | 70 | | | |
|  | Oligomer 9 | −55 | 25000 | | | | | | | | | | | | 45 |
| Photopolymerization initiator | Initiator 1 | | | | | | 4 | 4 | 4 | 4 | 4 | 4 | 4 | 4 | |
|  | Initiator 2 | | | 3 | 3 | 3 | | | | | | | | | 3 |
| Evaluation | Viscosity (mPa · s) | | | 347 | 853 | 421 | 193 | 324 | 375 | 508 | 400 | 1650 | 410 | 802 | 700 |
|  | Shore A hardness | Initial $r_0$ | | 25 | 33 | 36 | 40 | 29 | 33 | 50 | 30 | 37 | 30 | 60 | 21 |
|  |  | Post-15 s $r_1$ | | 25 | 33 | 36 | 40 | 29 | 33 | 50 | 30 | 37 | 30 | 60 | 21 |
|  | Stress relaxation | | | Absent | Absent | Absent | Absent | Absent | Absent | Absent | Absent | Absent | Absent | Absent | Absent |
|  | Elongation at break (%) | | | 292 | 356 | 160 | 220 | 425 | 350 | 170 | 225 | 215 | 420 | 195 | 450 |
|  | Breaking strength (MPa) | | | 0.9 | 2.7 | 0.8 | 1.7 | 2 | 2 | 2 | 1.5 | 2.1 | 1.5 | 2.4 | 0.7 |
|  | Storage modulus | 25° C. | | 1.1 | 1.4 | 1.3 | 2.3 | 1.3 | 1.5 | 2.6 | 1.3 | 1.6 | 1.4 | 4.7 | 0.7 |

TABLE 3-continued

| | Tg (°C.) | Mw | \multicolumn{12}{c}{Examples} |
| | | | 1 | 2 | 3 | 4 | 5 | 6 | 7 | 8 | 9 | 10 | 11 | 12 |
|---|---|---|---|---|---|---|---|---|---|---|---|---|---|---|
| tan δ 25°C. | | | 0.14 | 0.12 | 0.08 | 0.072 | 0.13 | 0.13 | 0.036 | 0.043 | 0.033 | 0.16 | 0.15 | 0.03 |
| Tg (°C.) | | | -4.8 | -6.8 | -5.8 | -6.8 | -6.8 | -5.8 | -7.8 | -15.8 | -23.9 | -7.8 | -8.9 | -6.8 |

TABLE 4

| | | Tg (°C.) | Mw | Examples | | | | | | | | | | |
|---|---|---|---|---|---|---|---|---|---|---|---|---|---|---|
| | | | | 2 | 13 | 14 | 12 | 15 | 16 | 17 | 18 | 19 | 20 | 21 |
| Reactive monomer | Monomer 3 | -7 | | 60 | 60 | 60 | 55 | 55 | 55 | 55 | 55 | 55 | 55 | 55 |
| Reactive oligomer | Oligomer 6 | -32 | 19000 | 40 | 40 | 40 | | | | | | | | |
| | Oligomer 9 | -55 | 25000 | | | | 45 | 45 | 45 | 45 | 45 | 45 | 45 | 45 |
| Ceramic particles | Silica particles 1 | | | | 25 | | | 50 | | | | | 30 | 10 |
| | Silica particles 2 | | | | | 20 | | | 25 | | | | | |
| | Silica particles 3 | | | | | | | | | 50 | | | | |
| | Silica particles 4 | | | | | | | | | | 30 | | | |
| | Silica particles 5 | | | | | | | | | | | 30 | | |
| Photopolymerization initiator | Initiator 2 | | | 3 | 3 | 3 | 3 | 3 | 3 | 3 | 3 | 3 | 3 | 3 |
| Evaluation | Viscosity (mPa · s) | | | 853 | 2560 | 1814 | 700 | 4350 | 1814 | 6310 | 2085 | 2312 | 2504 | 1302 |
| | Shore A hardness Initial $r_0$ | | | 33 | 45 | 42 | 21 | 46 | 42 | 60 | 42 | 41 | 38 | 26 |
| | Post-15 s $r_1$ | | | 33 | 45 | 42 | 21 | 46 | 42 | 60 | 42 | 41 | 38 | 26 |
| | Stress relaxation | | | Absent | Absent | Absent | Absent | Absent | Absent | Absent | Absent | Absent | Absent | Absent |
| | Elongation at break (%) | | | 356 | 653 | 620 | 450 | 830 | 620 | 280 | 300 | 465 | 664 | 510 |
| | Breaking strength (MPa) | | | 2.7 | 3.7 | 2.8 | 0.7 | 3.7 | 1.6 | 3.9 | 3.1 | 2.5 | 2.4 | 1.6 |
| | Storage modulus 25°C. | | | 1.4 | 2.5 | 2.1 | 0.7 | 2.5 | 2.1 | 4.5 | 2 | 2.1 | 1.9 | 1.2 |
| | tan δ 25°C. | | | 0.12 | 0.14 | 0.13 | 0.03 | 0.04 | 0.04 | 0.12 | 0.09 | 0.08 | 2.12 | 0.04 |
| | Tg (°C.) | | | -6.8 | -6.8 | -6.8 | -6.8 | -6.8 | -6.8 | -3.8 | -5.8 | -5.8 | -6.8 | -6.8 |

As shown in Tables 2 to 4, as compared with the comparative examples, the cured products of the photocurable resin compositions of the examples had a smaller tan δ of 0.2 or less, a higher elongation at break of 150% or more, and the stress relaxation was absent at the time of the Shore A hardness measurement, indicating that the cured products had excellent rubber elasticity. In addition, a certain degree of breaking strength was ensured for the cured products of the examples, and the cured products also had high flexibility.

As shown in Table 4, when the photocurable resin compositions included ceramic particles, even higher elongation at break and/or breaking strength was achieved. From the viewpoint of ensuring a better elongation at break, it is preferable to use ceramic particles having an aromatic hydrocarbon group as a surface functional group (second functional group). From the viewpoint of ensuring a better breaking strength, it is preferable to use ceramic particles having a surface functional group (a vinyl group, a methacryloyloxyalkyl group, etc.) having a polymerizable unsaturated bond.

Although the present invention has been described in terms of the presently preferred embodiments, it is to be understood that such disclosure is not to be interpreted as limiting. Various variations and modifications will become clearly apparent to those skilled in the art to which the present invention pertains upon reading the disclosure given above. Accordingly, the scope of the appended claims should be construed to encompass all variations and modifications without departing from the true spirit and scope of the present invention.

INDUSTRIAL APPLICABILITY

The photocurable resin compositions according to the above-described aspects of the present invention can provide a cured product that has excellent rubber elasticity through photocuring. Therefore, the photocurable resin compositions are suitable as materials for forming a three-dimensional optical shaped object in optical shaping applications. The optical shaped object can be used as an elastic member (an alternative to a rubber or an elastomer, for example). The elastic member is used, for example, in applications that require shock absorbing properties, vibration isolation, vibration control, and the like.

REFERENCE SIGNS LIST

1. . . . Optical shaping apparatus
2. . . . Platform
2a. . . . Pattern forming surface
3. . . . Resin tank
4. . . . Projector
5. . . . Photocurable resin composition
6. . . . Mold-releasing agent layer
7a. . . . Liquid film a
7b. . . . Liquid film b
8a. . . . Two-dimensional pattern a
8b. . . . Two-dimensional pattern b
L. . . . Light

The invention claimed is:

1. A photocurable resin composition comprising a reactive monomer, a reactive oligomer, and a photopolymerization initiator, wherein a cured product of the reactive monomer has a glass transition point of less than 20° C.,
a cured product of the reactive oligomer has a glass transition point of less than 20° C.,
a cured product of the photocurable resin composition has a loss tangent tan δ at 25° C. of 0.2 or less, and
the cured product of the photocurable resin composition has an elongation at break in accordance with ASTM D638 of 150% or more.

2. The photocurable resin composition according to claim 1, wherein the photocurable resin composition is a material for three-dimensional optical shaping for 3D printers.

3. The photocurable resin composition according to claim 1, wherein the cured product of the photocurable resin composition has a Shore A hardness at 23° C. of 100 or less.

4. The photocurable resin composition according to claim 1, wherein the reactive oligomer has a weight-average molecular weight of greater than 10,000 and less than or equal to 30,000.

5. The photocurable resin composition according to claim 1, wherein a mass ratio between the reactive monomer and the reactive oligomer is 20/80 to 80/20.

6. The photocurable resin composition according to claim 1, wherein the reactive monomer includes a monofunctional acrylic monomer having a non-aromatic ring.

7. The photocurable resin composition according to claim 1, wherein the reactive oligomer includes a polyoxyalkylene chain.

8. The photocurable resin composition according to claim 1, wherein the reactive oligomer includes a reactive oligomer having a (meth)acryloyl group.

9. The photocurable resin composition according to claim 1, wherein the photocurable resin composition has a viscosity of 200 mPa·s or more and 3,000 mPa·s or less at 25° C.

10. The photocurable resin composition according to claim 1, further comprising ceramic particles.

11. The photocurable resin composition according to claim 10, wherein the ceramic particles have, as a surface functional group, at least one selected from the group consisting of a hydrocarbon group, a halogenated hydrocarbon group, an acryloyloxyalkyl group, and a methacryloyloxyalkyl group.

12. The photocurable resin composition according to claim 11, wherein the ceramic particles have, as the surface functional group, at least one selected from the group consisting of an aromatic hydrocarbon group, a vinyl group, an acryloyloxyalkyl group, and a methacryloyloxyalkyl group.

13. The photocurable resin composition according to claim 10, wherein the ceramic particles include at least silica particles.

14. The photocurable resin composition according to claim 10, wherein a content of the ceramic particles is 1 mass % or more and 50 mass % or less.

15. The photocurable resin composition according to claim 10, wherein the ceramic particles have an average particle size of 100 nm or less.

16. A three-dimensional optical shaped object that is a photocured product of the photocurable resin composition according to claim 1.

17. A three-dimensional optical shaped object that is a photocured product of a photocurable resin composition,
wherein the three-dimensional optical shaped object has a glass transition point of less than 20° C., a loss tangent tan δ at 25° C. of 0.2 or less, and an elongation at break in accordance with ASTM D638 of 150% or more.

18. The three-dimensional optical shaped object according to claim 17, which has a laminate structure having a plurality of layers of cured patterns each of which is formed by photocuring the photocurable resin composition.

19. The three-dimensional optical shaped object according to claim 17, wherein the elongation at break is 900% or less.

20. The photocurable resin composition according to claim 1, wherein the reactive monomer includes at least an acrylic monomer.

21. The photocurable resin composition according to claim 1, wherein the reactive monomer includes at least one selected from the group consisting of an acrylic monomer having a non-aromatic ring, and a (meth)acrylate of a aliphatic hydroxy compound or an alkyleneoxide adduct thereof.

22. The photocurable resin composition according to claim 1, wherein the photocurable resin composition is a material for forming a three-dimensional optical shaped object having a laminate structure having a plurality of layers of cured patterns each of which is formed by photocuring the photocurable resin composition.

23. The photocurable resin composition according to claim 1, wherein each of the loss tangent tan δ and the elongation at break is measured for a sample obtained by completely curing a 500-μm-thick liquid membrane of the photocurable resin composition by irradiating LED light.

24. The photocurable resin composition according to claim 3, wherein the Shore A hardness is measured for a strip-shaped sample by using a DLP 3D printer, for an irradiation time per layer of 30 seconds and with a pitch of 100 μm in a z-axis direction, and
the sample has a length of 40 mm, a width of 20 mm and a thickness of 4 mm in the direction parallel to the z-axis.

* * * * *